(12) United States Patent
Cohen (10) Patent No.: US 8,458,522 B2
(45) Date of Patent: Jun. 4, 2013

(54) PESSIMISTIC MODEL-BASED TESTING

(75) Inventor: Ernest S. Cohen, Wyncote, PA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 12/899,226

(22) Filed: Oct. 6, 2010

(65) Prior Publication Data
US 2012/0089869 A1     Apr. 12, 2012

(51) Int. Cl.
*G06F 11/00* (2006.01)

(52) U.S. Cl.
USPC ................................. 714/32; 714/33

(58) Field of Classification Search
USPC ............... 714/32, 33, 37, 38.1, 738; 717/124, 717/125, 126; 703/13, 14, 22
See application file for complete search history.

(56) References Cited

U.S. PATENT DOCUMENTS

| | | | |
|---|---|---|---|
| 7,055,065 B2 | 5/2006 | Farchi et al. | |
| 7,493,544 B2 * | 2/2009 | Blass et al. | 714/741 |
| 7,590,520 B2 * | 9/2009 | Nachmanson et al. | 703/22 |
| 2003/0014734 A1 | 1/2003 | Hartman et al. | |
| 2003/0014735 A1 | 1/2003 | Achlioptas et al. | |
| 2003/0208351 A1 * | 11/2003 | Hartman et al. | 703/22 |
| 2005/0229044 A1 | 10/2005 | Ball | |
| 2006/0179383 A1 | 8/2006 | Blass et al. | |

OTHER PUBLICATIONS

Alfaro, "Computing Minimum and Maximum Reachability Times in Probabilistic Systems", retrieved on Sep. 28, 2010 at <<http://citeseerx.ist.psu.edu/viewdoc/download?doi=10.1.1.79.4334&rep=rep1&type=pdf>>Department of Electrical Engineering and Computer Sciences, University of California at Berkeley, 1999.

Ausiello, et al. "Decremental maintenance of reachability in hypergraphs and minimum models of Horn formulae", retrieved on Sep. 28, 2010 at <<http://citeseerx.ist.psu.edu/viewdoc/download?doi=10.1.1.33.1514&rep=rep1&type=pdf>>, 1997.

Ausiello et al., "Partially dynamic maintenance of minimum weight hyperpaths" Journal of Discrete Algorithms, vol. 3, Issue 1, Mar. 2005, pp. 27-46.

"Hypervisor Functional Specification", retrieved on Sep. 28, 2010 at <<http://download.microsoft.com/download/4/5/2/45275C52-93A9-4A29-BDBC-45DC1C82BC1D/Hypervisor%20Top%20Level%20Functional%20Specification%20v1.0.docx>>, Microsoft, 2008.

Nachmanson, et al. "Optimal Strategies for Testing Nondeterministic Systems", retrieved on Sep. 28, 2010, at <<http://research.microsoft.com/pubs/77437/OptimalStrategiesForTestingNondeterminsticSysteme%28ISSTA2004%29.pdf>>, ISSTA 04 Boston MA, 2004.

* cited by examiner

*Primary Examiner* — Dieu-Minh Le
(74) *Attorney, Agent, or Firm* — Lee & Hayes, PLLC (57) ABSTRACT

Model-based testing is performed by repeatedly constructing a test strategy in which each test stimulus will lead to increased test coverage regardless of the nondeterministic choices made by the system under test, and following said strategy until coverage is increased. As soon as no such strategy exists, testing stops.

20 Claims, 5 Drawing Sheets

PESSIMISTIC MODEL-BASED TESTING

BACKGROUND

Model-based testing (MBT) is a well-known approach to automating the testing of hardware and software systems. Instead of writing tests by hand, an abstract model of desired system behavior (henceforth referred to as the model) is used to check that the system under test (henceforth referred to as the system) conforms to this behavior; the model can be used either offline (using it to generate in advance a sequence of stimuli and anticipated responses) or online (using it explicitly during the testing process).

In MBT, a test is typically specified by describing the set of states to be explored by the test. In a deterministic system, where the model specifies the precise state resulting from any stimulus, it is straightforward to construct a sequence of inputs that will explore (i.e. drive the system to) every state in this set (assuming such an exploration is possible), and known optimization techniques can be used to design such an exploration so as to minimize the cost of the resulting test execution.

Most real specifications, however, require nondeterministic models in which the system is allowed to move to a plurality of states in response to a stimulus. Such nondeterminism can arise for several reasons. One reason is to allow the model to describe a variety of potentially suitable system implementations. Another reason is to allow the system to behave in alternative ways when facing exhaustion of resources such as memory. Another reason is to allow more efficient concurrent implementations in which data races introduce nondeterministic system behavior.

In testing that a system meets a nondeterministic specification, it is often assumed that the system is fair to each transition of the specification (i.e., the system will make every possible nondeterministic choice if given enough opportunities). But in fact, some transitions might be unlikely or impossible for a given implementation. Under these circumstances, common MBT techniques (e.g., generating a pre-computed tour of the state space) often lead to wasted test cycles and poor test coverage.

SUMMARY

This disclosure describes a method of model-based testing to ensure compliance with a nondeterministic specification. Testing is performed by repeatedly selecting test stimuli in accordance with a test strategy that will inevitably lead to increased test coverage regardless of nondeterministic choices made by the system under test. As soon as no such strategy exists, testing stops. The method provides efficient means to construct a sequence of strategies dynamically during test execution, and to detect when no such strategy exists.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
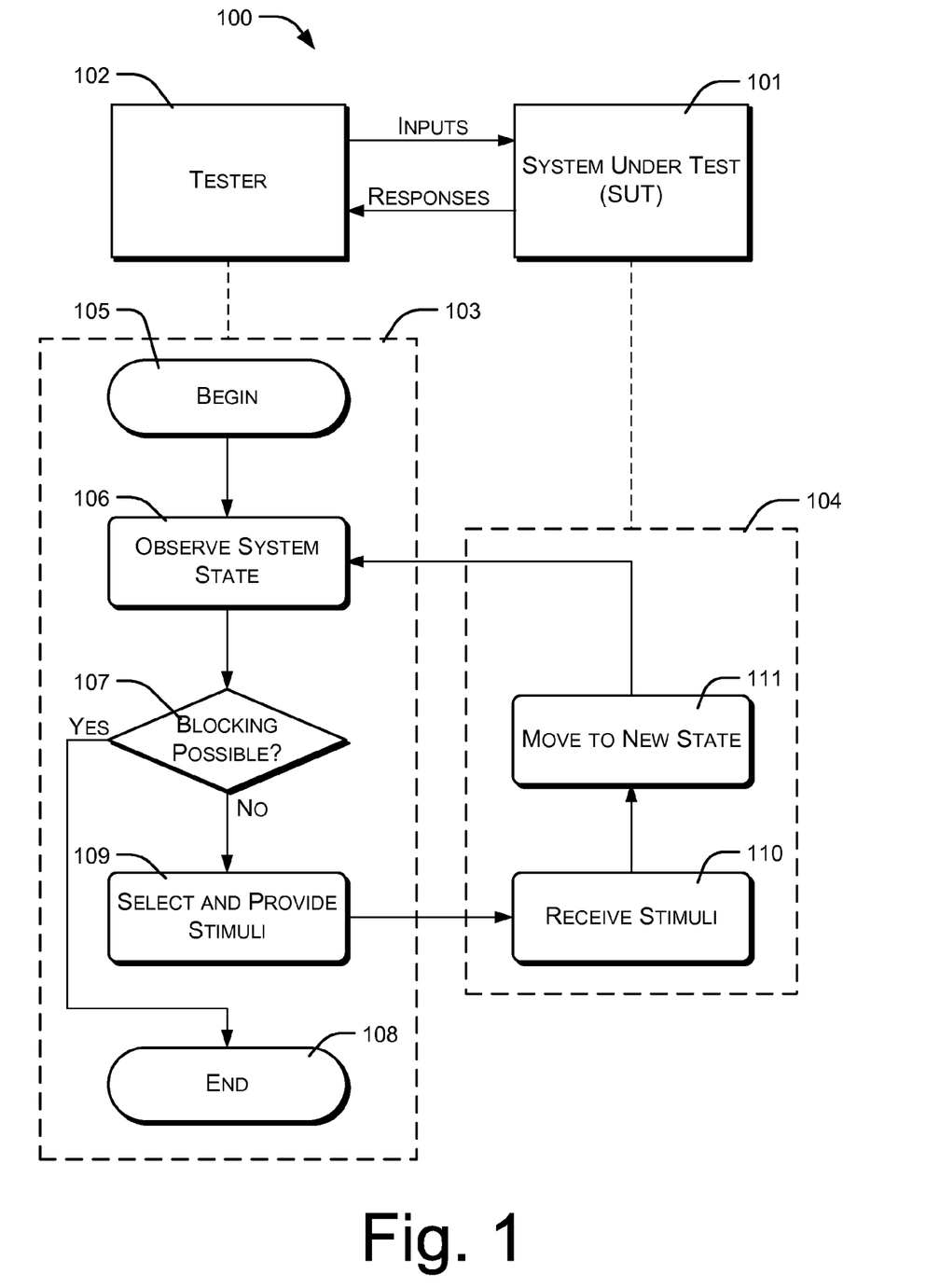
FIG. 1 is a flow diagram illustrating model-based system testing in accordance with one embodiment.

FIG. 1 shows a software testing environment and methodology, indicated generally by reference numeral 100. The environment includes a system under test 101 (also referred to herein simply as system 101) and a tester 102. System 101 may be any type of element, component, system, or machine that accepts or senses input or stimulus and that responds to such input or stimulus. As an example, system 101 may be a computer, a plurality of interacting computers, a computer program or application, a component of a computer program, a plurality of interacting computer programs, and so forth.

Conceptually, tester 102 may be any entity or component that provides input or stimulus to system 101 and that receives or observes the response of system 101 to the provided input or stimulus. In practice, tester 102 will often comprise an automated system such as a computer or a computer program. In some cases, tester 102 and system 101 may be software components running on the same computer, computer system, or data network. Tester 102 may in some cases emulate human interaction with the system 101.

A testing methodology is illustrated in FIG. 1 as a flowchart beneath system 101 and tester 102. Actions performed by tester 102 are shown at the left, within a dashed block 103. Actions performed by system 101 are shown at the right, within a dashed block 104.

Block 105 indicates the beginning of the testing methodology. Block 106 comprises tester 102 observing the current or existing state of system 101. As the testing iterates, this involves observing movement of the system from a previously existing state to a new or newly existing state.

An action 107 comprises tester 102 determining whether it is possible, at the current system state, for system 101 to block or prevent further test coverage. In the particular embodiment described herein, "test coverage" refers to the number of states of interest that have been visited by the system 101 in response to test stimuli; higher test coverage means that the system has been driven to a higher number of system states of interest.

The goal of tester 102 is to stimulate system 101 to visit as many states of the target set as possible. However, due to nondeterministic behavior of system 101, it may not always be possible to drive the system to some states; these states may only be achievable under circumstances that are beyond the control of tester 102. In the embodiment described herein, the tester continues testing until there exists, at the current system state, a strategy for the system that could prevent any further increase in test coverage. Action 107 comprises determining whether such a strategy exists. If such a strategy exists, indicating that the system has the potential for blocking further test coverage, the testing is simply ended at block 108. Otherwise, the testing continues at block 109.

Stated alternatively, testing continues as long as there is a strategy available to the tester that is certain to increase test coverage, regardless of nondeterministic system responses. When such a tester strategy is no longer available, testing is ended.

At block 109, the tester 102 selects a stimulus and provides it to the system 102. The stimulus is selected from one of the possible stimuli available at the current state, and it is selected in accordance with a testing strategy that is likely or certain, based on model analysis, to increase test coverage. In some embodiments, the stimulus may be selected as the one of the possible stimuli that will produce the shortest test path while also assuring or guaranteeing the highest level of test coverage. A specific method of selecting this stimulus will be described below.

At block 110, system 101 receives the stimulus selected by tester 102. At block 111, the system responds to the received stimulus by moving from the current state to a new state. The tester then observes the new system state at 106 (which now becomes the current state) and repeats the further actions that have already been described. Selecting a stimulus, providing it to system 101, and observing the new system state continues until it is determined at block 107 that further testing will no longer assure an increase of test coverage.

In order to perform actions 107 and 109, the tester 102 refers to a system model that models the system under test. In the described embodiment, the system model is represented as a hypergraph. A hypergraph is a set of hyperedges, where each hyperedge is given by a single head node and a (possibly empty) set of tail nodes. Each hyperedge of the model represents a stimulus that can be provided by the tester when the system is in the state represented by the head node, where the system can react to the stimulus by moving to any of the tail states of the hyperedge. Thus, testing can be viewed as a game between the tester and the system, where in each round the tester chooses a hyperedge pointing to the current state, and the system chooses which tail state to move to.

Figure 2:
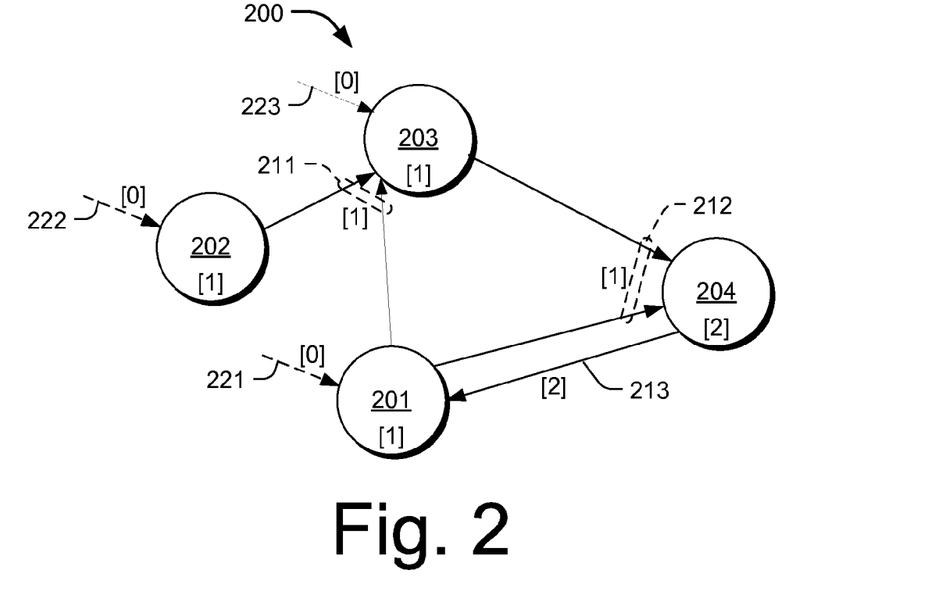
FIG. 2 is a hypergraph that may be used to model a nondeterministic system.

FIG. 2 shows an example of modeling a system as a hypergraph. FIG. 2 shows a hypergraph 200 having a plurality of nodes or vertices. The nodes are represented by circles, and include a node 201, a node 202, a node 203, and a node 204. The hypergraph 200 also includes a plurality of hyperedges, including a hyperedge 211, a hyperedge 212, and a hyperedge 213. Each hyperedge has a head, indicated in FIG. 2 by arrow heads. The head of a hyperedge is a single node, and the hyperedge is said to be incident on the node corresponding to its head. Each hyperedge also has a tail, which comprises a (possibly empty) set of tail nodes. For example, the head of hyperedge 211 is node 203. The tail of hyperedge 211 consists of nodes 201 and 202. The head of hyperedge 212 is node 204, and its tail consists of nodes 201 and 203. The head of hyperedge 213 is node 201 and its tail is node 204.

The vertices or nodes of hypergraph 200 correspond to potential states of the system under test. The terms "vertices," "nodes," and "states" are used interchangeably in the following discussion.

As mentioned above, the head of a hyperedge is the state in which a corresponding stimulus can be delivered to the system, and the tail of the hyperedge comprises the one or more states to which the system is allowed to transition in response to the delivered stimulus. In FIG. 2, the individual edges of the hyperedges are shown with arrowheads at their heads. Thus, the head of hyperedge 211 is node 203. The tail of hyperedge 211 consists of nodes 201 and 202. This indicates that given some particular stimulus at state 203, the system may transition to either of states 201 or 202. In a nondeterministic system as described herein, the tester 102 cannot reliably predict which of these two states will result from the stimulus. Furthermore, in some cases there may be no chance or only a very small chance of the system choosing a particular one of the states.

During testing, the tester 102 keeps track of which states of the system model have been explored. This is done by maintaining a collection of "test" hyperedges in the hypergraph. Each test hyperedge has an empty tail, and one test hyperedge is incident on each state that has not yet been explored. Thus, in an initial state, there is a single test hyperedge for each state other than the initial one; as the system moves to a new state during testing, if the new state has not previously been explored, the test hyperedge incident on that state is removed from the hypergraph. Thus, assuming an initial state 204 and that no other states of FIG. 2 have yet been explored, test hyperedges 221, 222, and 223 have been added to hypergraph 200 in FIG. 2, incident respectively on nodes 201, 202, and 203. Note that these hyperedges do not represent actual system behavior (i.e., they do not represent stimulus choices available to the tester), but are added arbitrarily to the system model in order to facilitate further steps that will be described below.

The set of reachable nodes of a hypergraph comprises the smallest set of nodes such that, for every hyperedge of the graph, if all of the tail nodes of the hyperedge are reachable, then the head of the hyperedge is also reachable. A hyperedge is reachable if all of the nodes in its tail are reachable. The rank of a reachable hyperedge is the maximum of the ranks of its tail nodes (0 if the tail is empty); the rank of a reachable node is one plus the minimum rank of its reachable incident hyperedges.

The rank of a node is an indicator of its reachability: a node having a finite rank is reachable. Unreachable nodes are deemed to have a rank of infinity.

In FIG. 2, the ranks of the nodes and hyperedges are shown in brackets. For example, the rank of node 202 is 1 (shown as "[1]"). Note that all of the test hyperedges have empty tails, and therefore have ranks of 0.

Figure 3:
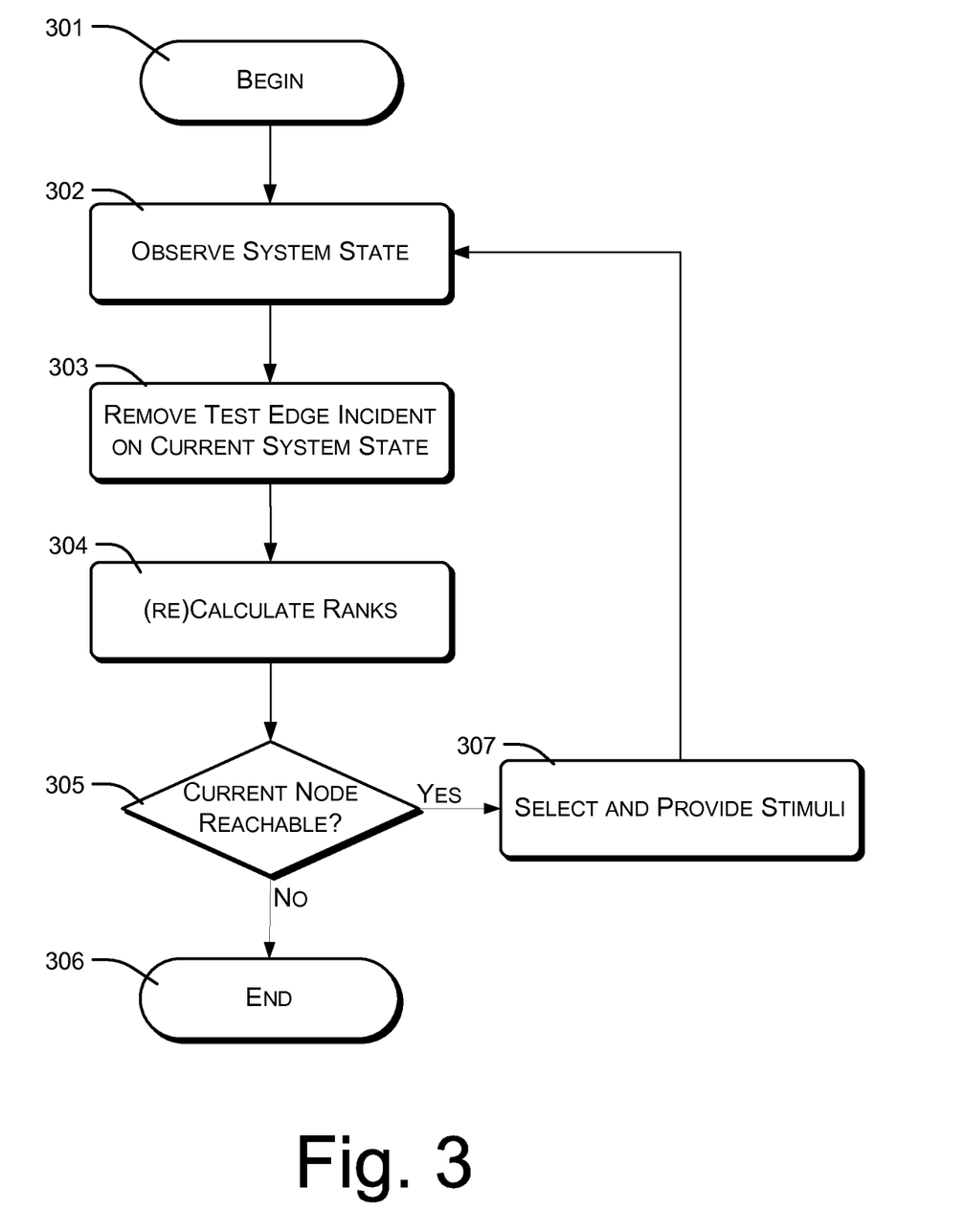
FIG. 3 is a flow diagram illustrating techniques performed by a tester to determine compliance of a nondeterministic system to a system model.

FIG. 3 illustrates implementation details regarding the testing process described with reference to FIG. 1, in an embodiment utilizing the hypergraph and related concepts described above with reference to FIG. 2. FIG. 3 shows steps performed by the tester 102 in such an embodiment.

The testing process begins at block 301, at which the system under test occupies an initial state. At block 302, the tester observes the system to determine its current or existing state. At block 303, the tester finds the node of the hypergraph corresponding to the current system state, and removes the test hyperedge (if any) incident on that node. If a hyperedge is removed at 303, then at block 304 the tester updates, calculates, or recalculates the reachability and ranks of nodes and hyperedges of the hypergraph. Known algorithms, such as those mentioned below, can be used to minimize this recalculation.

At block 305, the tester determines whether the current node is reachable. If the current node is not reachable, the tester simply ends the testing at block 306. Otherwise, if the current node is reachable, the testing continues with block 307.

Block 307 comprises selecting a stimulus and providing it to the system under test. Selecting a stimulus generally comprises evaluating the nondeterministic hypergraph model of the system to find system stimuli that will invariably increase test coverage regardless of the nondeterministic responses available to the system. This can be done by finding a hyperedge incident on the current node whose rank is lower than the rank of the current state. In particular, the incident hyperedge of minimal rank has this property, and this choice minimizes the worst-case number of stimuli needed to increase coverage.

After providing the selected stimulus to the system at 307, the tester then repeats the process described above beginning at block 302, in which the tester observes the new system state, continuing at block 303, in which the tester removes the test hyperedge incident on the newly current node, and so forth. This is repeated until a strategy for system stimulation that is certain to increase test coverage, regardless of nondeterministic system response, is no longer available, as indicated by the current node being unreachable.

Figure 4:
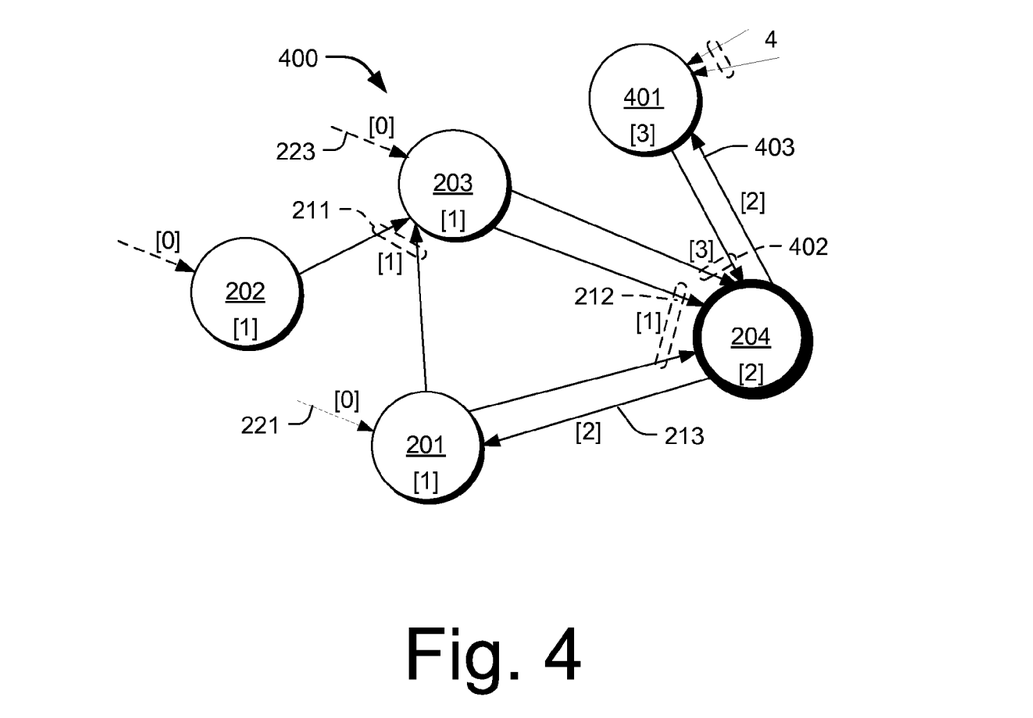
FIGS. 4-6 show the hypergraph of FIG. 2, with additions and modifications to illustrate the techniques shown in FIG. 3.

FIG. 4 shows a hypergraph 400 that is similar to FIG. 2, except that another node 401 has been added and the hypergraph has been updated to indicate that the system has (a) already visited node 401 and (b) is in a current state corresponding to node 204. Because nodes 204 and 401 have been occupied, their test hyperedges have been removed, and the ranks of all nodes and hyperedges have been recalculated or updated to account for this removal. It is assumed for purposes of discussion that node 401 has an incident hyperedge leading to other states (not shown) that result in node 401 having a rank of 3. Also, in comparison to FIG. 2 there is an additional hyperedge 402 incident on node 204, with tails at nodes 203 and 401. There is also a hyperedge 403 incident on node 401, having its single tail at node 204.

In accordance with action 305 of FIG. 3, the tester now determines whether the current node (node 204) is reachable. As stated above, the node is reachable if one of its incident hyperedges is reachable. Generally, a node can be determined to be reachable if it has a finite rank under the minimal rank solution. In this case, node 204 has a rank of 2, and is therefore reachable.

The tester then selects a stimulus as described with reference to block 307 of FIG. 3. In this example, there are two hyperedges incident on node 204 from which the tester can choose: hyperedge 212 and hyperedge 402. Hyperedge 212 satisfies either of the conditions set forth above: its rank of 1 is lower than the rank 2 of node 204 and its rank is the lowest of the hyperedges incident on node 204. Accordingly, the tester selects the stimulus corresponding to hyperedge 212, provides it to the system under test, and at block 302 observes the movement of the system to either node 201 or to node 203. Assuming that the system responds by moving to state 203, the tester then removes the test hyperedge 223 corresponding to the newly-occupied system state at block 303, and updates ranks at block 304.

Figure 5:
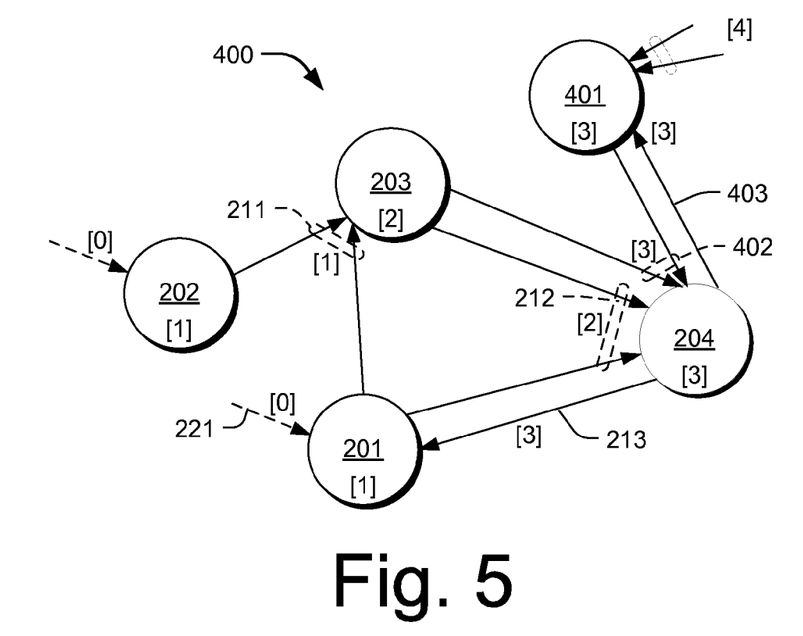

FIG. 5 shows the result of providing this stimulus, again assuming that the system responds by moving to state 203. The rank of node 203 is raised to 2, the rank of hyperedge 212 is raised to 2, the rank of node 204 is raised to 3, and the rank of hyperedge 213 is raised to 3. Note that the process of deleting hyperedges can cause ranks to increase, but not to decrease.

This process repeats until reaching a current node that (after any needed rank updates) is not reachable or that does not have a finite rank. In this example, the current node 203 has a finite rank and is therefore reachable. Thus, the tester selects a hyperedge whose rank is less than the rank of current node 203. Hyperedge 211 satisfies this criteria (as well as being the only available hyperedge incident on node 203). The tester provides the stimulus corresponding to hyperedge 211 and observes the system response.

Figure 6:
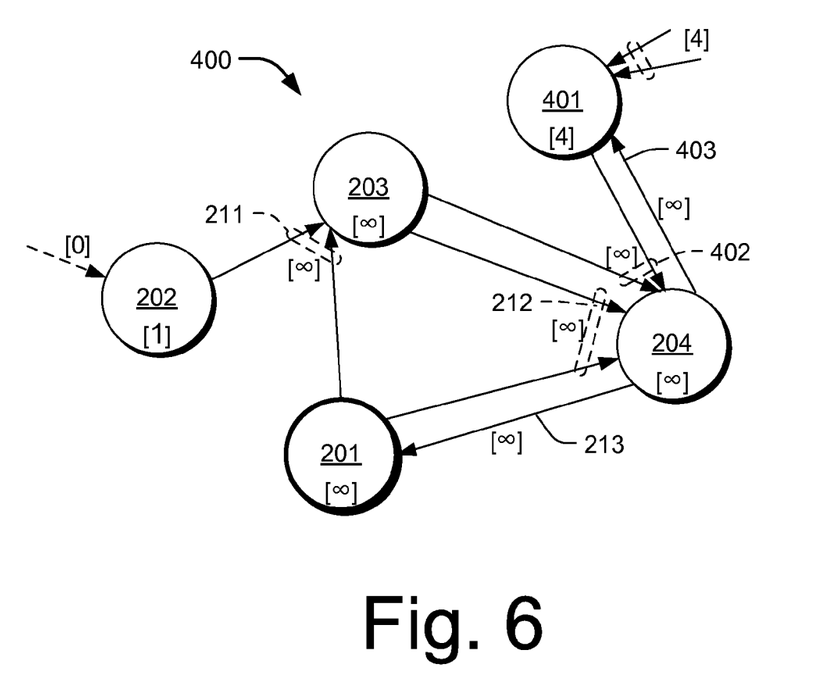

FIG. 6 shows one possible response to this stimulus, in which the system has moved to state 201. Removing test hyperedge 221 has raised the ranks of nodes 201, 203, and 204 to infinity (i.e., has made them unreachable), and has similarly raised the ranks of hyperedges 211, 212, 213, 402, and 403 to infinity. The current state—state 201—no longer has a finite rank, and is therefore deemed unreachable. Because of that, testing ends at this point.

During testing, updating ranks of the hyperedges incident on the current state can be performed using the decremental hypergraph reachability algorithm described in G. Ausiello, P. G. Franciosa, and D. Frigioni, *Partially Dynamic Maintenance of Minimum Weight Hyperpaths*, J. of Discrete Algorithms, 3(1):27-46, 2005. This algorithm maintains ranks for all states and hyperedges in total time O(E+S·H), where E is the number of states marked, S is the total number of states, and H is the size of the hypergraph. However, since ranks can only increase in the process described above, and this algorithm updates ranks in increasing rank order, updating of ranks can be delayed for hyperedges and states whenever they exceed the rank of the current system state. Adding to the hyperedges incident on unmarked states can also be delayed. This improves the worst-case complexity to O(E+R·H'), where R is the maximum rank assumed by the system state prior to termination (i.e., the maximum number of stimuli between explorations), and H' is the total size of the live hyperedges. In the worst case R is equal to E, but in degree, R is equal to O(log(E)).

Note that in the case in where an operation can fail without a state change, the head of the corresponding hyperedge appears in the tail. This type of hyperedge is unusable in the strategy described above. It is often desirable to allow such a hyperedge to be used as if the failure were impossible, at least until a test hits the failing case at least once. This can be achieved by adding a new state and hyperedge to the hypergraph, in order to break the self-loop.

Also note that because the worst-case computational cost grows with the maximum rank assumed by the system state, it may in some cases be useful to compress a long sequence of preparatory operations into a single hyperedge.

The method described above is fully compatible with lazy generation of the state space, where hyperedges incident on a state are generated only when the state is first visited (i.e., when its test hyperedge is removed), since until it is visited, its rank is 1 regardless of the non-test hyperedges incident upon it.

In some embodiments, the system may provide special operations to reset the test state; these can be modeled as ordinary hyperedges. Also, in some embodiments, the system may include states that are part of the model but whose entry does not constitute an increase in test coverage; such states can be handled by considering them to be visited before testing starts (i.e., omitting their test hyperedges in the initial test configuration). Also, in some embodiments, certain collections of states might be considered equivalent for the purposes of test coverage, so that visiting one of them is as good as visiting another; such cases can be handled by deleting, on entry to a state, all test hyperedges to nodes whose further visitation is rendered moot by the entry to said state.

In some embodiments, different stimuli might involve different costs for the tester. For example, certain stimuli might correspond to an expensive reset of the test state, use of a nonrenewable resource (such as a write to flash memory), or even explicit expense (e.g., invoking a service performed by a third party). These costs can be incorporated into the method by associating a positive cost with each hyperedge, where the cost of the hyperedge gives the cost to the tester of providing the corresponding stimulus. The definition of rank is then changed so that the formula for computing the rank of a node uses the rank of a hyperedge plus its cost (rather than one more than the rank of the hyperedge). The same decremental algorithm described above can still be used, but the worst-case computational costs may be greater.

In some embodiments, certain hyperedges may be guaranteed to behave in certain ways that allow additional strategies. For example, a hyperedge might be guaranteed to be fair to some subset of the tail nodes, meaning that repeatedly choosing that hyperedge is guaranteed to eventually lead to the state moving to one of the states of the subset. The same approach of choosing a winning strategy still applies, but a different approach to updating rank and reachability, such as those known from the field of automata on infinite strings, would be used to determine existence of a winning strategy.

In some embodiments, the tester can choose a strategy that maximizes the set of nodes that will eventually be visited, rather than minimizing the worst-case cost of getting to the first unvisited node.

Figure 7:
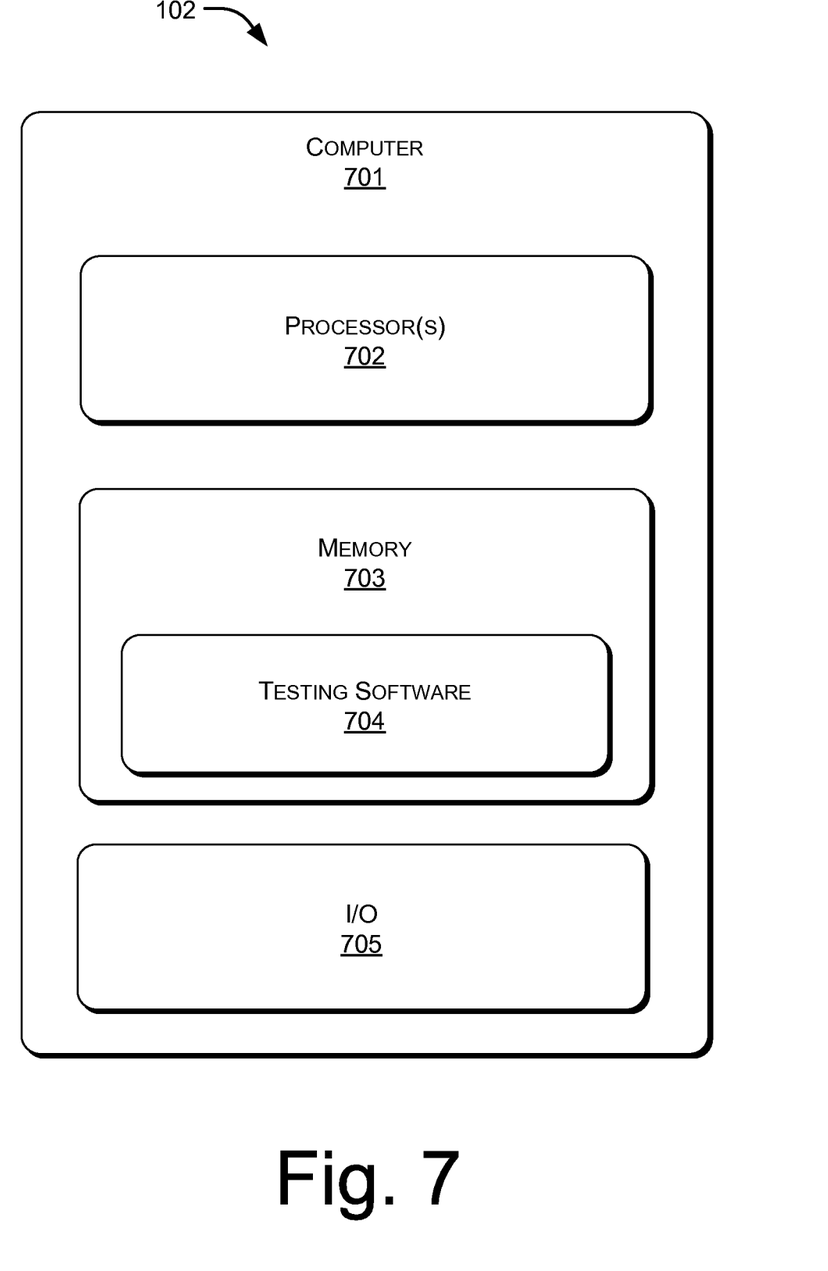
FIG. 7 is a simplified block diagram showing components of a computing system that may be utilized to perform the techniques described herein.

FIG. 7 shows relevant high-level components of tester 102, as an example of various types of computing equipment that may be used for this purpose. In one implementation, tester 102 may comprise a general-purpose computer 701 having one or more processors 702 and computer-readable memory 703. The test procedures described above can be implemented as software 704, such as one or more programs or test routines, comprising sets or sequences of instructions that reside in memory 703 for execution by the one or more processors 702. The computer 701 may have input/output facilities 705 for providing input or stimuli to the system under test, and for observing system response. The input/output facilities may allow various different types of interaction with a system under test, such logical, visual, electrical, and/or physical interactions.

Testing software 704 may reside in memory 703 as shown, and may also be stored and distributed in various ways and using different means, such as by storage on different types of computer-readable memory 703, including portable and removable media. The testing software may also be distributed by transmission from a repository, using a data network or other types of data computer communication systems.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A method of system testing, comprising:
    modeling a system as a hypergraph having nodes and hyperedges, wherein the nodes correspond respectively to system states and the hyperedges incident on a particular node correspond to different stimuli that can be provided to the system when in the state corresponding to the particular node;
    maintaining test hyperedges in the model, each of the test hyperedges having an empty tail and being incident on a different node;
    maintaining ranks of reachable nodes and hyperedges;
    repeatedly, until the node corresponding to the current system state is unreachable:
    removing any test hyperedge incident on the node corresponding to the current system state;
    updating the ranks of reachable nodes and hyperedges upon removing any test hyperedge;
    referencing the hypergraph to find one of the hyperedges incident on the node corresponding to the current system state whose rank is lower than the rank of the current system state;
    providing the stimulus corresponding to said one of the hyperedges; and
    observing movement of the system between system states.

2. The method of claim 1, further comprising ending the system testing when the current node is unreachable.

3. The method of claim 1, further comprising determining whether the node corresponding to the current system state is unreachable by evaluating its rank.

4. The method of claim 1, wherein said one of the hyperedges has a minimal rank among the hyperedges incident on the node corresponding to the current system state.

5. A method for testing conformance of a system to a nondeterministic model, comprising:
    providing system stimulus in accordance with a test strategy that will increase test coverage regardless of nondeterministic system response; and
    repeating the providing until a test strategy that will increase test coverage regardless of nondeterministic system response is not available.

6. The method of claim 5, further comprising observing system response to the provided system stimulus.

7. The method of claim 5, wherein the nondeterministic model is represented by a hypergraph.

8. The method of claim 5, wherein:
    the nondeterministic model is represented by a hypergraph having nodes and hyperedges;
    the nodes correspond respectively to system states;
    the hyperedges incident on a particular node correspond respectively to different stimuli that can be provided to the system at the system state corresponding to the particular node;
    the hypergraph includes test hyperedges that are incident on nodes corresponding to unexplored system states; and
    the method further comprises repeatedly removing the test hyperedges incident on nodes corresponding to explored system states.

9. The method of claim 8, further comprising:
    evaluating reachability of the model nodes; and
    ending the providing when the node corresponding to the current system state is unreachable.

10. The method of claim 8, further comprising:
    maintaining ranks of the model nodes and hyperedges;
    wherein the selecting comprises referencing the hypergraph to find one of the hyperedges incident on the node corresponding to the current system state whose rank is lower than the rank of the node corresponding to the current system state.

11. The method of claim 8, further comprising:
    maintaining ranks of the model hyperedges;
    wherein the selecting comprises referencing the hypergraph to find one of the hyperedges having a minimal rank from among those incident on the node corresponding to the current system state.

12. The method of claim 8, further comprising:
    maintaining ranks of the model nodes and hyperedges;
    wherein the selecting comprises referencing the hypergraph to find one of the hyperedges incident on the node corresponding to the current system state whose rank is lower than the rank of the current system state; and
    ending the providing if there is no hyperedge incident on the node corresponding to the current system state whose rank is lower than the rank of the current system state.

13. The method of claim 8, further comprising:
maintaining ranks of the model nodes and hyperedges;
wherein the selecting comprises referencing the hypergraph to find one of the hyperedges incident on the node corresponding to the current system state whose rank is lower than the rank of the current system state; and
ending the providing if the node corresponding to the current system state is unreachable.

14. A method for testing conformance of a system to a nondeterministic model that is represented as a hypergraph having nodes and hyperedges, wherein the nodes correspond respectively to system states and the hyperedges incident on a particular node correspond to different system stimuli that can be provided at the system state corresponding to the particular node, the method comprising:
maintaining test hyperedges in the model for unexplored system states, each of the test hyperedges having an empty tail and being incident on a different one of the model nodes that are unexplored;
calculating ranks of the model hyperedges; and
repeatedly selecting system stimulus based on the ranks of the hyperedges that are incident on the node corresponding to the current system state.

15. The method of claim 14, further comprising ending the selecting when the node corresponding to current system state is unreachable.

16. The method of claim 14, further comprising:
determining reachability of the model nodes; and
repeatedly selecting the system stimulus until the node corresponding to the current system state is unreachable.

17. The method of claim 14, wherein the selecting comprises selecting system stimulus in accordance with a test strategy that will increase test coverage regardless of nondeterministic system responses.

18. The method of claim 14, wherein the selecting comprises selecting system stimulus in accordance with a test strategy that will increase test coverage regardless of nondeterministic system responses, the method further comprising ending the selecting if there is no test strategy that will invariably increase test coverage regardless of nondeterministic system responses.

19. The method of claim 14, further comprising calculating ranks of the model nodes and hyperedges, wherein selecting the system stimulus comprises finding one of the hyperedges incident on the node corresponding to the current system state whose rank is lower than the rank of the node corresponding to the current system state.

20. The method of claim 14, further comprising calculating ranks of the model hyperedges, wherein selecting the system stimulus comprises finding one of the hyperedges incident on the node corresponding to the current system state having a minimal rank among the hyperedges incident on the node corresponding to the current system state.

* * * * *